(12) United States Patent
Singh

(10) Patent No.: US 10,692,617 B2
(45) Date of Patent: Jun. 23, 2020

(54) CONTAINER AND SYSTEM FOR HANDLING DAMAGED NUCLEAR FUEL, AND METHOD OF MAKING THE SAME

(71) Applicant: Holtec International, Camden, NJ (US)

(72) Inventor: Krishna P. Singh, Hobe Sound, FL (US)

(73) Assignee: HOLTEC INTERNATIONAL, Camden, NJ (US)

( * ) Notice: Subject to any disclaimer, the term of this patent is extended or adjusted under 35 U.S.C. 154(b) by 238 days.

(21) Appl. No.: 15/689,571

(22) Filed: Aug. 29, 2017

(65) Prior Publication Data

US 2018/0025800 A1    Jan. 25, 2018

Related U.S. Application Data

(63) Continuation of application No. 14/239,752, filed as application No. PCT/US2012/051634 on Aug. 20, 2012, now Pat. No. 9,748,009.

(Continued)

(51) Int. Cl.
*B23K 1/00* (2006.01)
*G21F 5/008* (2006.01)
(Continued)

(52) U.S. Cl.
CPC .......... *G21F 5/008* (2013.01); *B23K 2101/12* (2018.08); *B23K 2103/172* (2018.08); *G21C 19/26* (2013.01); *G21F 5/012* (2013.01)

(58) Field of Classification Search
CPC .......... G21F 5/008; G21F 5/012; G21C 19/26
See application file for complete search history.

(56) References Cited

U.S. PATENT DOCUMENTS 3,111,586 A * 11/1963 Rogers .............. G21F 5/10
250/507.1
3,725,635 A * 4/1973 Fink .............. B23K 10/02
219/121.46

(Continued)

FOREIGN PATENT DOCUMENTS

DE      4402282 C1 *  4/1995 .......... B32K 9/0253
DE    19632678 A1 *  2/1998 ............ G21C 19/07

(Continued)

OTHER PUBLICATIONS

IAEA, Management of Spent Fuel from Nuclear Power Reactors, Jun. 22, 2006, Retrieved from the Internet: <URL: http://www-pub.iaea.org/MTCD/publications/PDF/Pub1295_web.pdf> pp. 343-344.

(Continued)

*Primary Examiner* — Kiley S Stoner
(74) *Attorney, Agent, or Firm* — The Belles Group, P.C.

(57) ABSTRACT

A container and system for handling damaged nuclear fuel, and a method of making the same. In one embodiment, the invention is a damaged fuel container having a specially designed top cap that can be detachably coupled to the elongated tubular wall by simply translating the top cap into proper position within the elongated tubular wall, wherein biased locking elements automatically lock the top cap to the elongated tubular wall. In another embodiment, the vent screens of the damaged fuel container are integrally formed rather than being separate components. In still other embodiments, the lower vent screens are arranged on an upstanding portion of the damaged fuel container. In an even further embodiment, the elongated tubular wall is formed by an extrusion process.

12 Claims, 12 Drawing Sheets

Related U.S. Application Data

(60) Provisional application No. 61/525,583, filed on Aug. 19, 2011.

(51) Int. Cl.
- *G21F 5/012* (2006.01)
- *G21C 19/26* (2006.01)
- *B23K 103/16* (2006.01)
- *B23K 101/12* (2006.01)

(56) References Cited

U.S. PATENT DOCUMENTS

| | | | | | |
|---|---|---|---|---|---|
| 3,886,368 | A * | 5/1975 | Rollins | | G21F 5/008 250/507.1 |
| 3,962,587 | A * | 6/1976 | Dufrane | | G21F 5/012 250/506.1 |
| 4,044,267 | A * | 8/1977 | Bevilacqua | | G21C 19/40 376/272 |
| 4,119,859 | A * | 10/1978 | Karzmar | | G21C 19/07 376/272 |
| 4,273,838 | A * | 6/1981 | Biemiller | | B23K 35/3053 219/137 WM |
| 4,292,528 | A * | 9/1981 | Shaffer | | G21F 5/012 250/506.1 |
| 4,399,366 | A * | 8/1983 | Bucholz | | G21F 5/012 250/507.1 |
| 4,474,727 | A * | 10/1984 | Kmonk | | G21F 5/008 206/443 |
| 4,706,366 | A * | 11/1987 | Madiot | | G21C 19/40 29/523 |
| 4,738,388 | A * | 4/1988 | Bienek | | G21F 5/12 228/135 |
| 4,765,525 | A * | 8/1988 | Popp | | B23K 9/0213 228/9 |
| 4,781,883 | A * | 11/1988 | Daugherty | | G21C 19/40 250/507.1 |
| 4,827,139 | A * | 5/1989 | Wells | | G21F 5/012 250/506.1 |
| 4,865,804 | A * | 9/1989 | McGeary | | G21C 3/10 376/451 |
| 4,874,573 | A * | 10/1989 | Wood | | G21F 5/12 376/272 |
| 4,896,046 | A * | 1/1990 | Efferding | | G21F 5/012 250/507.1 |
| 4,925,620 | A * | 5/1990 | Aiello | | G21C 7/113 376/260 |
| 4,929,412 | A * | 5/1990 | Dixon | | G21C 7/113 376/260 |
| 4,980,535 | A * | 12/1990 | Aiello | | G21C 7/113 219/121.63 |
| 4,983,352 | A * | 1/1991 | Efferding | | G21F 5/012 376/250 |
| 4,997,618 | A * | 3/1991 | Efferding | | G21F 5/012 376/272 |
| 5,063,299 | A * | 11/1991 | Efferding | | G21F 5/008 250/507.1 |
| 5,121,849 | A * | 6/1992 | Ellingson | | G21C 19/07 220/248 |
| 5,381,919 | A * | 1/1995 | Griffin | | B60K 15/0406 220/326 |
| 5,438,597 | A * | 8/1995 | Lehnert | | G21F 5/008 376/272 |
| 5,550,882 | A * | 8/1996 | Lehnert | | G21F 5/008 376/272 |
| 5,602,885 | A * | 2/1997 | Ahmed | | B23K 31/02 376/248 |
| 5,625,657 | A * | 4/1997 | Gallacher | | G21C 3/334 376/261 |
| 5,674,411 | A * | 10/1997 | Hanson | | B23K 9/0286 219/61 |
| 5,787,140 | A * | 7/1998 | Dunlap | | G21C 3/324 376/313 |
| 6,118,838 | A * | 9/2000 | Robert | | G21C 19/40 376/272 |
| 6,216,877 | B1 * | 4/2001 | Lindstrom | | D21D 5/16 209/273 |
| 6,256,363 | B1 * | 7/2001 | Methling | | G21F 5/012 376/272 |
| 6,630,100 | B1 * | 10/2003 | Murakami | | C22C 32/00 419/12 |
| 2002/0152841 | A1 * | 10/2002 | Ohsono | | B22F 1/0003 75/249 |
| 2003/0081714 | A1 * | 5/2003 | Lindquist | | G21C 19/07 376/260 |
| 2004/0020919 | A1 * | 2/2004 | Hirano | | B23K 9/167 219/604 |
| 2004/0025560 | A1 * | 2/2004 | Funakoshi | | B21C 1/26 72/358 |
| 2004/0062338 | A1 * | 4/2004 | Ohsono | | G21F 5/10 376/272 |
| 2004/0141579 | A1 * | 7/2004 | Methling | | G21F 5/012 376/272 |
| 2005/0061853 | A1 * | 3/2005 | Packer | | B23K 20/123 228/112.1 |
| 2005/0117687 | A1 * | 6/2005 | Carver | | G21F 5/012 376/272 |
| 2005/0224729 | A1 * | 10/2005 | Tamaki | | G21F 5/00 250/507.1 |
| 2006/0222139 | A1 * | 10/2006 | Pennington | | G21F 5/008 376/272 |
| 2007/0153965 | A1 * | 7/2007 | Choi | | C23C 4/06 376/417 |
| 2008/0049886 | A1 * | 2/2008 | Lahille | | G21F 5/012 376/261 |
| 2008/0197302 | A1 * | 8/2008 | Fago | | G21F 5/015 250/506.1 |
| 2010/0027733 | A1 * | 2/2010 | Cantonwine | | G21C 3/32 376/434 |
| 2011/0051883 | A1 * | 3/2011 | McInnes | | G21C 19/07 376/462 |
| 2011/0172484 | A1 * | 7/2011 | Singh | | G21F 5/06 588/16 |
| 2012/0067005 | A1 * | 3/2012 | Argoud | | G21C 3/38 53/396 |
| 2016/0005501 | A1 * | 1/2016 | Singh | | G21F 5/008 250/507.1 |
| 2016/0196887 | A1 * | 7/2016 | Singh | | G21F 5/008 220/592.01 |
| 2017/0110210 | A1 * | 4/2017 | Singh | | G21F 5/008 |
| 2018/0322970 | A1 * | 11/2018 | Singh | | G21F 9/34 |

FOREIGN PATENT DOCUMENTS

| | | | | |
|---|---|---|---|---|
| DE | 19640393 A1 * | 4/1998 | | G21C 3/06 |
| EP | 0684611 | 11/1995 | | |
| EP | 1439547 | 7/2004 | | |
| FR | 2840723 A1 * | 12/2003 | | G21C 19/42 |
| JP | 59209487 A * | 11/1984 | | B23K 37/053 |
| JP | 06234070 A * | 8/1994 | | |
| JP | 2000321392 | 11/2000 | | |
| JP | 3231190 | 11/2001 | | |
| RU | 2127656 C1 * | 3/1999 | | B23K 9/0253 |
| WO | 9739456 | 10/1997 | | |
| WO | WO-9853460 A2 * | 11/1998 | | G21F 5/012 |

OTHER PUBLICATIONS

Corresponding PCT/US2012/051634 International Search Report and Written Opinion dated Apr. 8, 2013.

* cited by examiner

CONTAINER AND SYSTEM FOR HANDLING DAMAGED NUCLEAR FUEL, AND METHOD OF MAKING THE SAME

CROSS-REFERENCE TO RELATED PATENT APPLICATIONS

This application is a continuation of U.S. patent application Ser. No. 14/239,752 filed Mar. 21, 2014, which is a U.S. national stage application under 35 U.S.C. § 371 of PCT Application No. PCT/US12/51634, filed on Aug. 20, 2012, which claims the benefit of U.S. Provisional Patent Application No. 61/525,583, filed Aug. 19, 2011, the entireties of which are incorporated herein by reference.

FIELD OF THE INVENTION

The present invention relates generally to containers and systems for handling nuclear fuel, and specifically to containers and systems for handling nuclear fuel whose physical integrity has been compromised, and methods of making the same.

BACKGROUND OF THE INVENTION

Damaged nuclear fuel is nuclear fuel that is in some way physically impaired. Such physical impairment can range from minor cracks in the cladding to substantial degradation on various levels. When nuclear fuel is damaged, its uranium pellets are no longer fully contained in the tubular cladding that confines the pellets from the external environment. Moreover, damaged nuclear fuel can be distorted from its original shape. As such, special precautions must be taken when handling damaged nuclear fuel (as compared to handling intact nuclear fuel) to ensure that radioactive particulate matter is contained. Please refer to USNRC's Interim Staff Guidance #2 for a complete definition of fuel that cannot be classified as "intact" and, thus, falls into the category of damaged nuclear fuel for purposes of this application. As used herein, damaged nuclear fuel also includes nuclear fuel debris.

Containers and systems for handling damaged nuclear fuel are known. Examples of such containers and systems are disclosed in U.S. Pat. No. 5,550,882, issued Aug. 27, 1996 to Lehnart et al., and U.S. Patent Application Publication No. 2004/0141579, published Jul. 22, 2004 to Methling et al. While the general structure of a container and system for handling damaged nuclear fuel is disclosed in each of the aforementioned references, the containers and systems disclosed therein are less than optimal for a number of reasons, including inferior venting capabilities of the damaged nuclear fuel cavity, difficulty of handling, inability to be meet tight tolerances dictated by existing fuel basket structures, lack of adequate neutron shielding, and/or manufacturing complexity or inferiority.

Thus, a need exists for an improved container and system for handling damaged nuclear fuel, and methods of making the same.

SUMMARY OF THE INVENTION

In one embodiment, the invention can be a method of forming an elongated tubular container for receiving damaged nuclear fuel, the method comprising: a) extruding, from a material comprising a metal and a neutron absorber, an elongated tubular wall having a container cavity; b) forming, from a material comprising a metal that is metallurgically compatible with the metal of the elongated tubular wall, a bottom cap comprising a first screen having a plurality of openings; and c) autogenously welding the bottom cap to a bottom end of the elongated tubular wall, the plurality of openings of the first screen forming vent passageways to a bottom of the container cavity.

In another embodiment, the invention can be a container for receiving damaged nuclear fuel, the method comprising: an extruded tubular wall forming a container cavity about a container axis, the extruded tubular wall formed of a metal matrix composite having neutron absorbing particulate reinforcement; a bottom cap coupled to a bottom end of the extruded tubular wall; a top cap detachably coupled to a top end of the extruded tubular wall; a first screen comprising a plurality of openings that define lower vent passageways into a bottom of the container cavity; and a second screen comprising a plurality of openings that define upper vent passageways into a top of the container cavity.

In yet another embodiment, the invention can be a system for storing and/or transporting nuclear fuel comprising: a vessel comprising defining a vessel cavity and extending along a vessel axis; a fuel basket positioned within the vessel cavity, the fuel basket comprising a grid forming a plurality of elongated cells, each of the cells extending along a cell axis that is substantially parallel to the vessel axis; and at least one elongated tubular container comprising a container cavity containing damaged nuclear fuel positioned within one of the cells, the elongated tubular container comprising: an extruded tubular wall forming a container cavity about a container axis, the extruded tubular wall formed of a metal matrix composite having neutron absorbing particulate reinforcement; a bottom cap coupled to a bottom end of the extruded tubular wall; a top cap detachably coupled to a top end of the extruded tubular wall; a first screen comprising a plurality of openings that define lower vent passageways into a bottom of the container cavity; and a second screen comprising a plurality of openings that define upper vent passageways into a top of the container cavity.

In still another embodiment, the invention can be a system for storing and/or transporting nuclear fuel comprising: a vessel defining a vessel cavity and extending along a vessel axis; a fuel basket positioned within the vessel cavity, the fuel basket comprising a plurality of elongated cells; an elongated tubular container positioned within one of the cells, the elongated tubular container comprising: an elongated tubular wall forming a container cavity about a container axis, the tubular wall comprising a top portion having a plurality of locking apertures and a top edge defining a top opening into the container cavity; a bottom cap coupled to a bottom end of the elongated tubular wall; a top cap comprising a plurality of locking elements that are alterable between a retracted state and an extended state, the locking elements biased into the extended state; a first screen comprising a plurality of openings that define lower vent passageways between the vessel cavity and a bottom of the container cavity; a second screen comprising a plurality of openings that define upper vent passageways between the vessel cavity and a top of the container cavity; and the top cap and the elongated tubular wall configured so that upon the top cap being inserted through the top opening, contact between the locking element and the elongated tubular wall forces the locking elements into a retracted state, and wherein upon the locking element becoming aligned with the locking apertures, the locking elements automatically returning the extended state such that the locking member protrude into the locking apertures, thereby detachably coupling the top cap to elongated tubular wall.

In a further embodiment, the invention can be a system for storing and/or transporting nuclear fuel comprising: a vessel defining a vessel cavity and extending along a vessel axis; a fuel basket positioned within the vessel cavity, the fuel basket comprising a plurality of elongated cells; an elongated tubular container comprising a container cavity for containing damaged nuclear fuel positioned within one of the cells, the elongated tubular container comprising: a first screen comprising a plurality of openings that define lower vent passageways between the vessel cavity and a bottom of the container cavity, the plurality of openings of the first screen comprising a lowermost opening that is a first distance from a floor of the vessel cavity and an uppermost opening that is a second distance from the floor of the vessel cavity, the second distance being greater than the first distance; and a second screen comprising a plurality of openings that define upper vent passageways between the vessel cavity and a top of the container cavity.

In an even further embodiment, the invention can be a system for storing and/or transporting nuclear fuel comprising: a vessel defining a vessel cavity and extending along a vessel axis; a fuel basket positioned within the vessel cavity, the fuel basket comprising a plurality of elongated cells; an elongated tubular container comprising a container cavity for containing damaged nuclear fuel positioned within one of the cells, the elongated tubular container comprising: a first screen comprising a plurality of openings that define lower vent passageways between the vessel cavity and a bottom of the container cavity, the first screen located on an upstanding portion of the elongated tubular container that is substantially non-perpendicular to the vessel axis; and a second screen comprising a plurality of openings that define upper vent passageways between the vessel cavity and a top of the container cavity.

In a still further embodiment, the invention can be a damaged fuel container, or system incorporating the same, in which the one or more of the screens of the container are integrally formed into the body of the container.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE DRAWINGS

Figure 1:
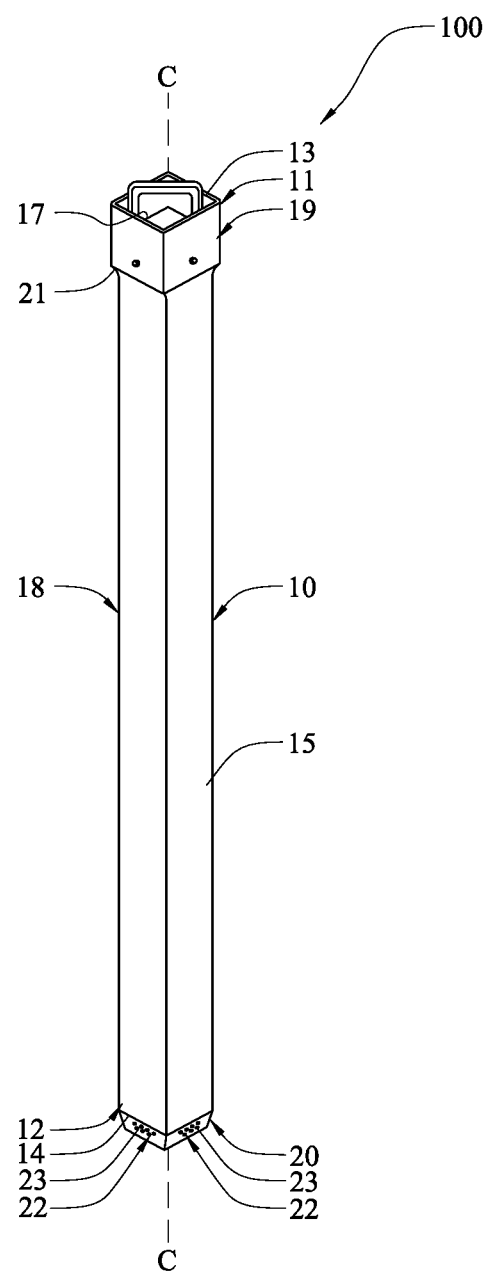
FIG. 1 is an isometric view of a damaged fuel container according to an embodiment of the present invention.

The following description of the illustrated embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Referring first to FIGS. 1-4 concurrently, a damaged fuel container ("DFC") 100 according to an embodiment of the present invention is illustrated. The DFC 100 incorporates an inventive design (and is formed by an inventive method) that allows high density packaging of damaged fuel in pressure vessels, such as metal casks or multi-purpose canisters (described in greater detail below). The DFC 100 can be used to package damaged nuclear fuel at nuclear reactors, such as the Fukushima Daiichi site. The DFC 100 can be used to safely containerize nuclear fuel of compromised cladding integrity and is a unitary waste package for the fuel that may be in various stages of dismemberment ranging from minor cracks in the cladding to its substantial degradation. As described in greater detail below, the DFC 100 is designed to be loaded with damaged nuclear fuel and positioned within a fuel basket which, in turn, is housed in a pressure vessel such as a metal cask or a multi-purpose canister.

The DFC 100 is an elongated tubular container that extends along a container axis C-C. As will become more apparent from the description below, the DFC 100 is specifically designed so as to not form a fluid-tight container cavity 101 therein. This allows the container cavity 101 of the DFC 100, and its damaged nuclear fuel payload, to be adequately dried for dry storage using standard dry storage dehydration procedures. Suitable dry storage dehydration operations and equipment that can be used to dry the DFC 100 (and the system 1000) are disclosed in, for example: U.S. Patent Application Publication No. 2006/0288607, published Dec. 28, 2006 to Singh; U.S. Patent Application Publication No. 2009/0158614, published Jun. 2, 2009 to Singh et al.; and U.S. Patent Application Publication No. 2010/0212182, published Aug. 22, 2010 to Singh. While a fluid-tight boundary is not formed by the DFC 100, the DFC 100 (when fully assembled as shown in FIGS. 1-4) creates a particulate confinement boundary for its damaged nuclear fuel payload, thereby preventing radioactive particles and debris from escaping the container cavity 101.

The DFC 100 generally comprises an elongated tubular wall 10, a bottom cap 20 and a top cap 30. In one embodiment, the elongated tubular wall 10 is formed of a material comprising a metal and a neutron absorber. As used herein the term "metal" includes metals and metal alloys. In certain embodiments, suitable metals may include without limitation aluminum, steel, lead, and titanium while suitable neutron absorbers may include without limitation boron, boron carbide and carborundem. As used herein, the term "aluminum" includes aluminum alloys. In one specific embodiment, the metal is an aluminum and the neutron absorber material is boron or boron carbide. In other embodiments, the elongated tubular wall 10 is formed entirely of a metal matrix composite having neutron absorbing particulate reinforcement. Suitable metal matrix composites having neutron absorbing particulate reinforcement include, without limitation, a boron carbide aluminum matrix composite material, a boron aluminum matrix composite material, a boron carbide steel matrix composite material, a carborundum aluminum matrix composite material, a carborundum titanium matrix composite material and a carborundum steel matrix composite material. Suitable aluminum boron carbide metal matrix composites are sold under the name Metamic® and Boralyn®. The use of an aluminum-based metal matrix composite ensures that the DFC 100 will have good heat rejection capabilities.

Figure 10:
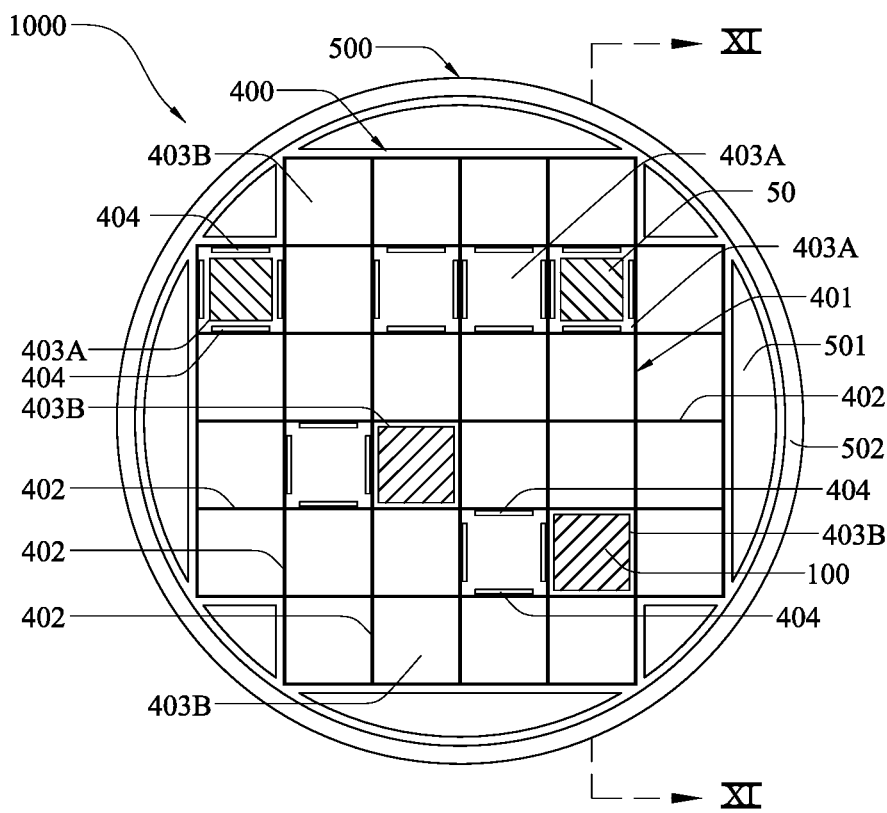
FIG. 10 is a top view of a system according to an embodiment of the present invention, wherein a loaded damaged fuel container of FIG. 1 and intact fuel assemblies are schematically illustrated therein.

The boron carbide aluminum matrix composite material of which the elongated tubular wall 10 is constructed, in one embodiment, comprises a sufficient amount of boron carbide so that the elongated tubular wall 10 can effectively absorb neutron radiation emitted from the damage nuclear fuel loaded within the container cavity 101, thereby shielding adjacent nuclear fuel (damaged or intact) in the fuel basket 400 from one another (FIG. 10). In one embodiment, the elongated tubular wall 10 is constructed of an aluminum boron carbide metal matrix composite material that is greater than 25% by volume boron carbide. In other embodiments, the elongated tubular wall 10 is constructed of an aluminum boron carbide metal matrix composite material that is between 20% to 40% by volume boron carbide, and more preferably between 30% to 35%. Of course, the invention is not so limited and other percentages may be used. The exact percentage of neutron absorbing particulate reinforcement required to be in the metal matrix composite material will depend on a number of factors, including the thickness of the elongated tubular wall 10, the spacing/pitch between adjacent cells within the fuel basket 400 (FIG. 10), and the radiation levels of the damaged nuclear fuel. As will be discussed in greater detail below, the elongated tubular wall 10 is formed by an extrusion process in certain embodiments and, thus, the DFC 100 can be considered an extruded tubular container in such embodiments. Extrusion is preferred because it results in an elongated tubular wall 10 that is free of bending or warping that can be caused by welding processes that are used to create tubes.

The elongated tubular wall 10 extends along the container axis C-C from a top end 11 to a bottom end 12. The top end 11 terminates in a top edge 13 while the bottom end 12 terminates in a bottom edge 14. The elongated tubular wall 10 also comprises an outer surface 15 and an inner surface 16 that forms a container cavity 101. The top edge 13 defines a top opening 17 that leads into the container cavity 101.

The elongated tubular wall 10 comprises a top portion 18 and a bottom portion 19. In the exemplified embodiment, the bottom portion 19 extends from the bottom edge 14 to a transition shoulder 21 while the top portion 18 extends from the transition shoulder 21 to the top edge 13. The top portion 19, in the exemplified embodiment, is an upper section of the elongated tubular wall 10 that flares slightly outward moving from the transition shoulder 21 to the top edge 13. Thought of another way, the top portion 19 of the elongated tubular wall 10 has a transverse cross-section that gradually increases in size moving from the transition shoulder 21 to the top edge 13. The bottom portion 18, in the exemplified embodiment, has a substantially constant transverse cross-section along its length, namely from the bottom edge 14 to the transition shoulder 21. In other embodiments, the top portion 19 can also have a transverse cross-section that is substantially constant along its length from the transition shoulder 21 to the top edge 13. In such an embodiment, the transverse cross-section of the top portion can be larger than the transverse cross-section of the bottom portion 18. In still other embodiments, the elongated tubular wall 10 may have a substantially constant transverse cross-section along its entire length from the bottom edge 14 to the top edge 13. In such an embodiment, the elongated tubular wall 10 will be devoid of a transition shoulder 21 and the top and bottom portions 18, 19 would have no physical distinction.

In the exemplified embodiment, the elongated tubular wall 10 has a substantially constant thickness along its entire length. In one embodiment, the elongated tubular wall 10 has a wall thickness between 1 mm to 3 mm, with about 2 mm being preferred. Of course, the invention is not so limited and the elongated tubular wall 10 can have wall thickness that is variable and of different empirical values and ranges.

The inner surface 16 of the elongated tubular wall 10 defines the container cavity 101. In the exemplified embodiment, the portion of the container cavity 101 defined by the bottom portion 18 has a transverse cross-section that is substantially constant in size while the portion of the container cavity 101 defined by the top portion 19 has a transverse cross-section that increases in size moving from the transition shoulder 21 to the top edge 13.

In the exemplified embodiment, the elongated tubular wall 10 has a transverse cross-section that is substantially rectangular in shape along its entire length from the bottom edge 14 to the top edge 13. Similarly, the container cavity 101 also has a transverse cross-section that is substantially rectangular in shape along its entire length. Of course, the transverse cross-sections can be other shapes in other embodiments, and can even be dissimilar shapes between the top and bottom portions 18, 19.

The bottom cap 20 is fixedly coupled to the bottom end 12 of the elongated tubular wall 10 while the top cap 30 is detachably coupled to the top end 11 of the elongated tubular wall 10. More specifically, the bottom cap 20 is coupled to the bottom edge 14 of the elongated tubular wall 10. As will be described in greater detail below, in the exemplified embodiment, the bottom cap 20 is fixedly coupled to the bottom end 12 of the elongated tubular wall 10 by an autogenous welding technique, such as by friction stir welding. In other embodiments, the bottom cap 20 is fixedly coupled to the bottom end 12 of the elongated tubular wall 10 using other connection techniques.

The bottom cap 20, in certain embodiments, is formed of a material comprising a metal that is metallurgically compatible with the metal of the elongated tubular wall 10 for welding. In one embodiment, the bottom cap is formed of aluminum. The bottom cap 20, in a preferred embodiment, is formed by a casting process.

The bottom cap 20 comprises a plurality of first screens 22. Each of the first screens 22 comprises a plurality of openings 23 that define lower vent passageways into a bottom 102 of the container cavity 101. While in the exemplified embodiment the first screens 22 are incorporated into the bottom cap 20, the first screens 22 can be incorporated into the bottom end 12 of the elongated tubular wall 10 in other embodiments. Furthermore, while the exemplified DFC 100 comprises four first screens in the exemplified embodiment, more or less first screens 22 can be included in other embodiments.

In one embodiment, the openings 23 of the first screens 22 are small enough so that radioactive particulate matter cannot pass therethrough but are provided in sufficient density (number of openings/area) to allow sufficient venting of air, gas or other fluids through the container cavity 101. In one embodiment, the openings 23 have a diameter in a range of 0.03 mm to 0.1 mm, and more preferably a diameter of about 0.04 mm. The openings 23 may be provided for each of the first screens 22, in certain embodiments, to have a density of 200 to 300 holes per square inch. The invention, however, is not limited to any specific dimensions or hole density unless specifically claimed.

In the exemplified embodiment, the first screens 22 are integrally formed into a body 24 of the bottom cap 20 by creating the openings 23 directly into the body 24 of the bottom cap 20. The openings 23 can be formed into the body 24 of the bottom cap 20 by punching, drilling or laser cutting techniques. In one embodiment, it is preferred to form the openings using a laser cutting technique. Laser cutting allows very fine openings 23 to be formed with precision and efficiency. In alternate embodiments, the openings of the first screens 22 may not be integrally formed into the bottom cap 20 (or the elongated tubular wall 10). Rather, larger through holes can be formed in the bottom cap 20 that are then covered by separate first screens 22, such as wire mesh screens.

Figure 2:
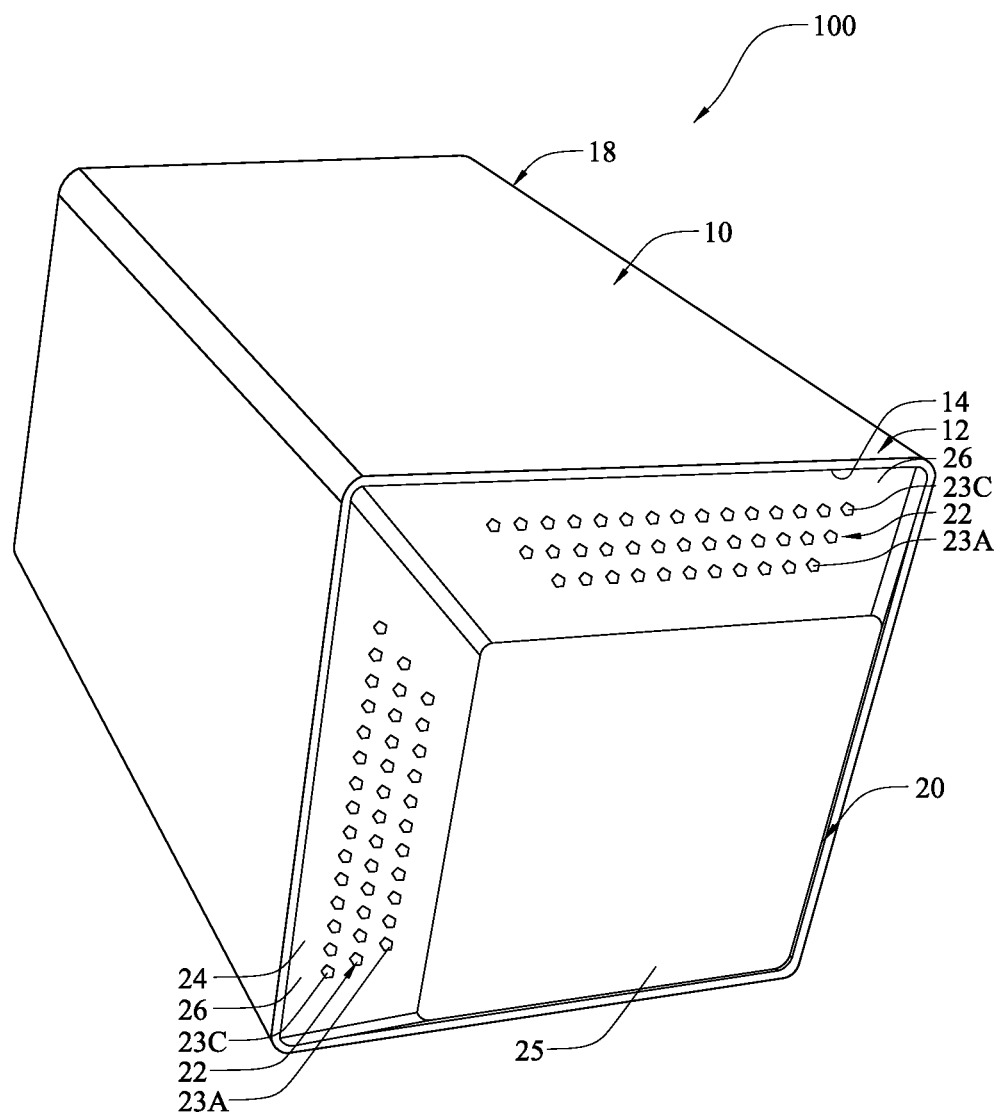
FIG. 2 a bottom perspective view of a bottom portion of the damaged fuel container of FIG. 1.
Figure 5:
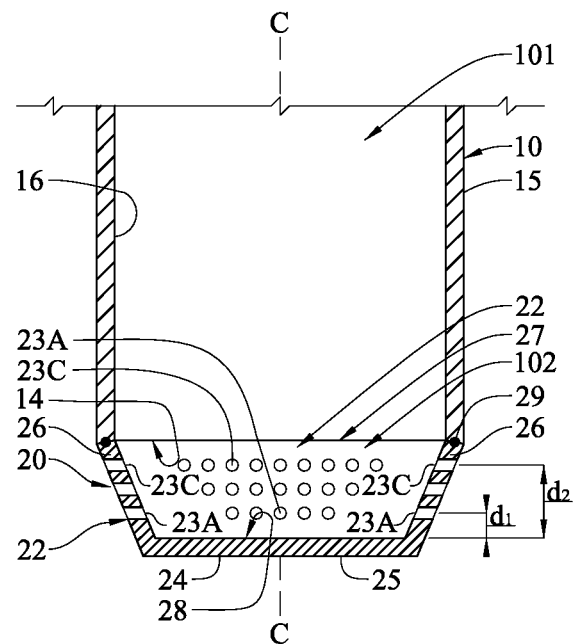
FIG. 5 is a close-up longitudinal cross-sectional schematic of the bottom portion of the damaged fuel container of FIG. 1.
Figure 11:
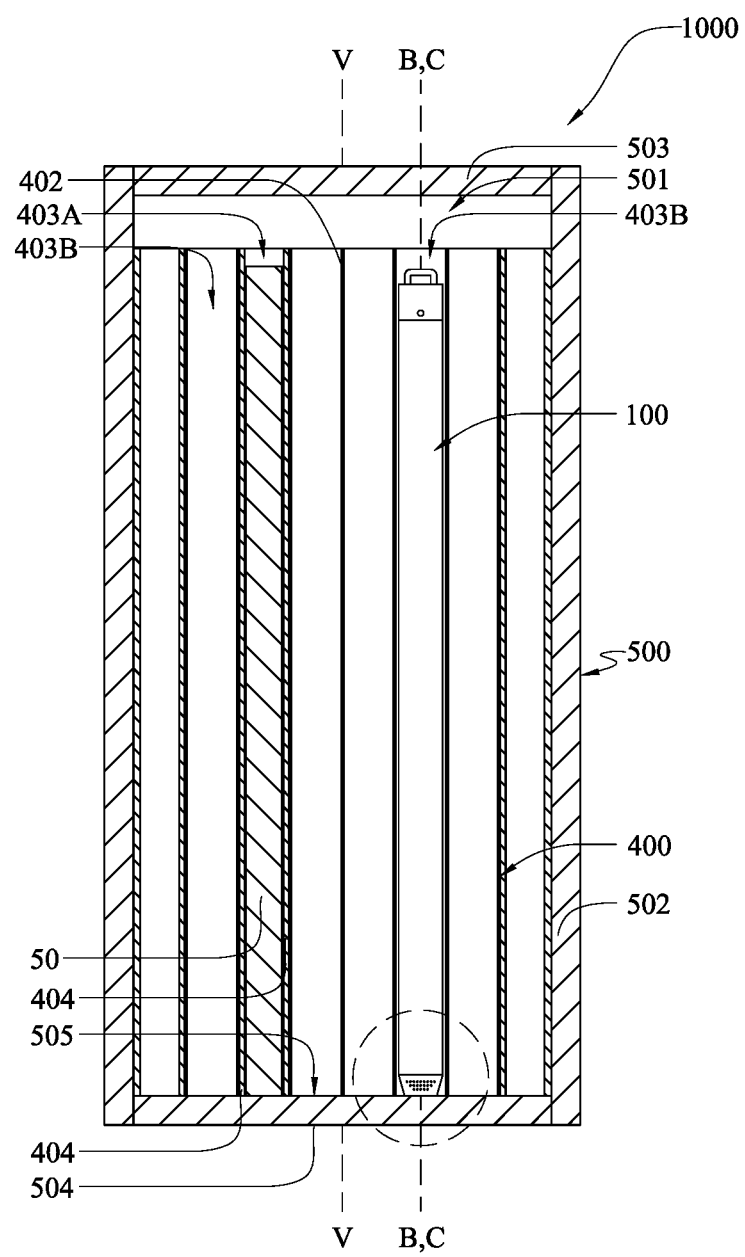
FIG. 11 is cross-sectional view taken along view XI-XI of FIG. 10.

Referring now to FIGS. 2 and 5 concurrently, the bottom cap 20 generally comprises a floor plate 25 and an oblique wall 26 extending upward from a perimeter of the floor plate 25. In the exemplified embodiment, the oblique wall 26 is integrally formed with the floor plate 25, for example, during the casting formation process. The oblique wall 26 is a rectangular annular wall that forms a tapered end of the DFC 100, which helps with inserting the DFC 100 into a cell 403B of the fuel basket 400 (FIGS. 10 and 11). The oblique wall 26 extends oblique to the container axis C-C and terminates in an upper edge 27. The upper edge 27 of the oblique wall 26 is coupled to the bottom edge 14 of the elongated tubular wall 10 by an autogenous butt weld 29 that seals the interface and integrally couples the components together so as to produce a junction that is smooth with the outer surface 15.

Figure 12:
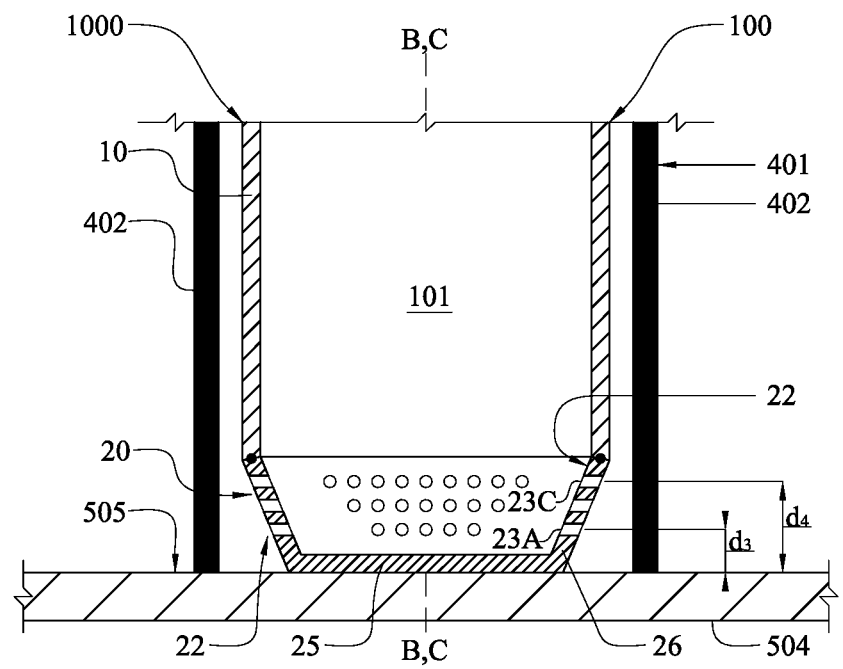
FIG. 12 is a close-up view of area XII-XII of FIG. 11.

The floor plate 25 comprises a top surface 28 that forms a floor of the container cavity 101. As can be seen in FIG. 5, one of the first screens 22 is located on each of the four sections of the oblique wall 26, which collectively form its rectangular transverse cross-sectional shape. The oblique wall 26 is an upstanding portion of the DFC 100. By locating the first screens 22 on an upstanding portion of the DFC 100 (rather than a portion that only has a horizontal component, such as the floor plate 25), the openings 23 of the first screens 23 are less susceptible to becoming clogged from particulate matter from the damaged nuclear fuel. Moreover, the openings 23 do not become choked-off (i.e., blocked) when the DFC 100 is supported upright in a fuel basket 400 and the floor plate 25 is in surface contact with a floor 505 of the vessel 500 (FIG. 12). In certain embodiments, an additional first screen 22 may be added to the floor plate 25 of the bottom cap 20 to ensure adequate leakage of retained water.

The openings 23 of each of the first screens 22 comprise a lowermost opening(s) 23A and an uppermost opening(s) 23C. The lowermost opening 23A is located a first axial distance $d_1$ above the floor 28 of the container cavity 101 while the uppermost most opening 23C is located a second distance $d_2$ above the floor 28 of the container cavity 101. The second distance $d_2$ is greater than the first distance $d_1$. As discussed below, the DFC 100, in certain embodiments, is intended to be oriented so that the container axis C-C is substantially vertical when the DFC 100 is positioned within the fuel basket 400 of the vessel 500 for transport and/or storage. Thus, in the exemplified embodiment, both the lowermost and uppermost openings 23A, C are located a vertical distance above the floor 28 of the container cavity 101. As a result, the first screens 22 are unlikely to become clogged by settling particulate debris as each of $d_1$ and $d_2$ are vertical distances.

As mentioned above, it is beneficial to have the first screens 22 located on an upstanding portion of the DFC 100, which in the exemplified embodiment is the oblique wall 26 of the bottom cap 20. In other embodiments, the bottom cap 20 is designed so that the wall 26 is not oblique to the container axis C-C but rather substantially parallel thereto. In such and embodiment, the first screens 22 are located on this vertical annular wall of the bottom cap 20. In still another embodiment, the bottom cap 20 may simply be a floor plate without any significant upstanding portion. In such an embodiment, the first screens 22 can be located on the bottom end 12 of the elongated tubular wall 10 itself, which would be considered the upstanding portion that is substantially parallel to container axis C-C. Of course, in such embodiments, the upstanding portion of the elongated tubular wall 10 on which the first screens 22 are located can be oriented oblique to the container axis C-C.

Figure 3:
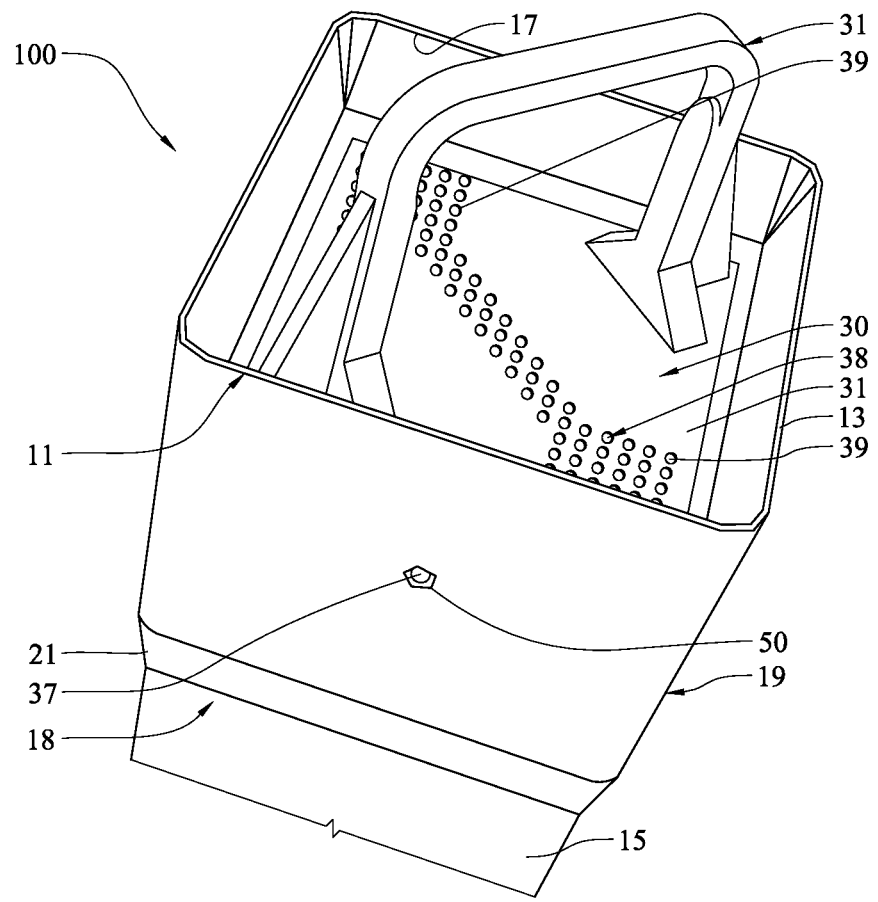
FIG. 3 is a top perspective view of a top portion of the damaged fuel container of FIG. 1.
Figure 4:
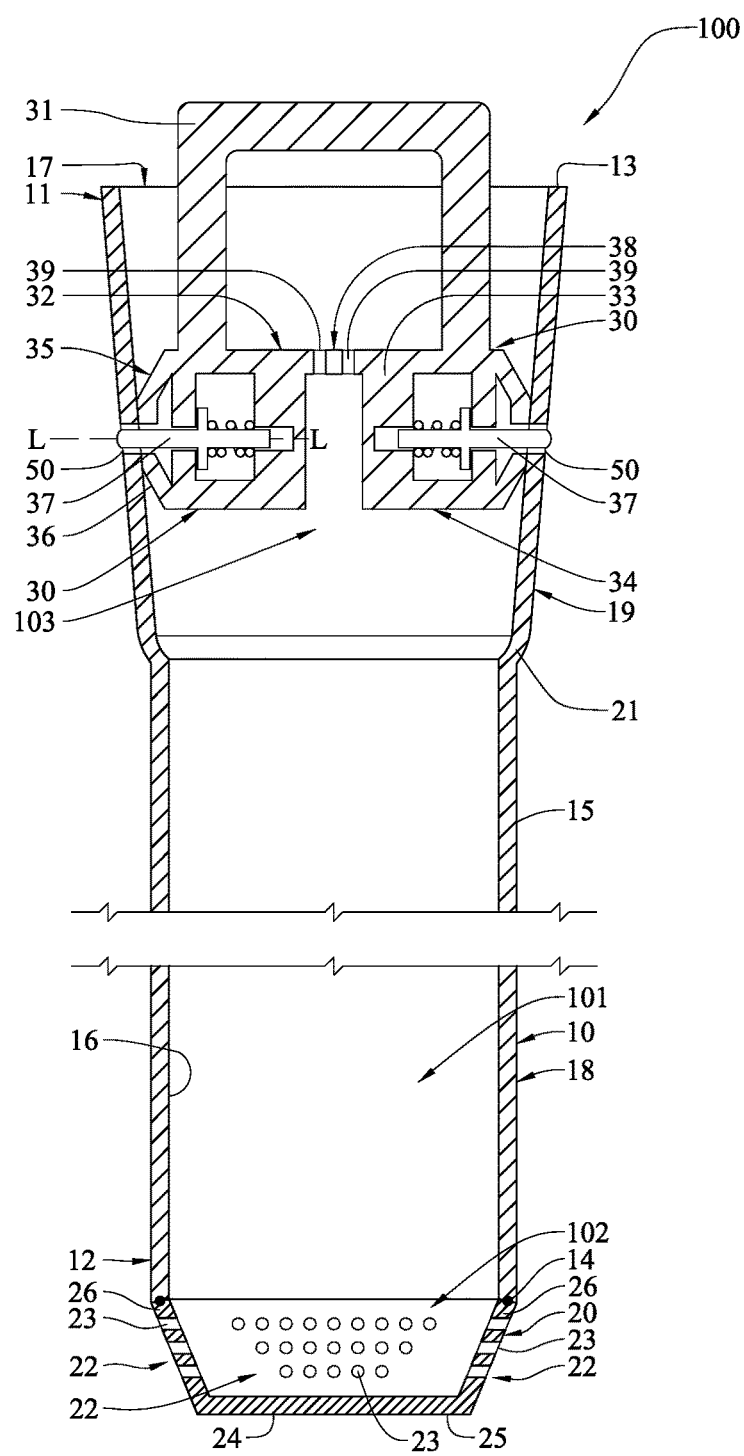
FIG. 4 is a longitudinal cross-sectional schematic of the damaged fuel container of FIG. 1 taken along the container axis, wherein a middle portion of the damaged fuel container has been omitted.
Figure 6:
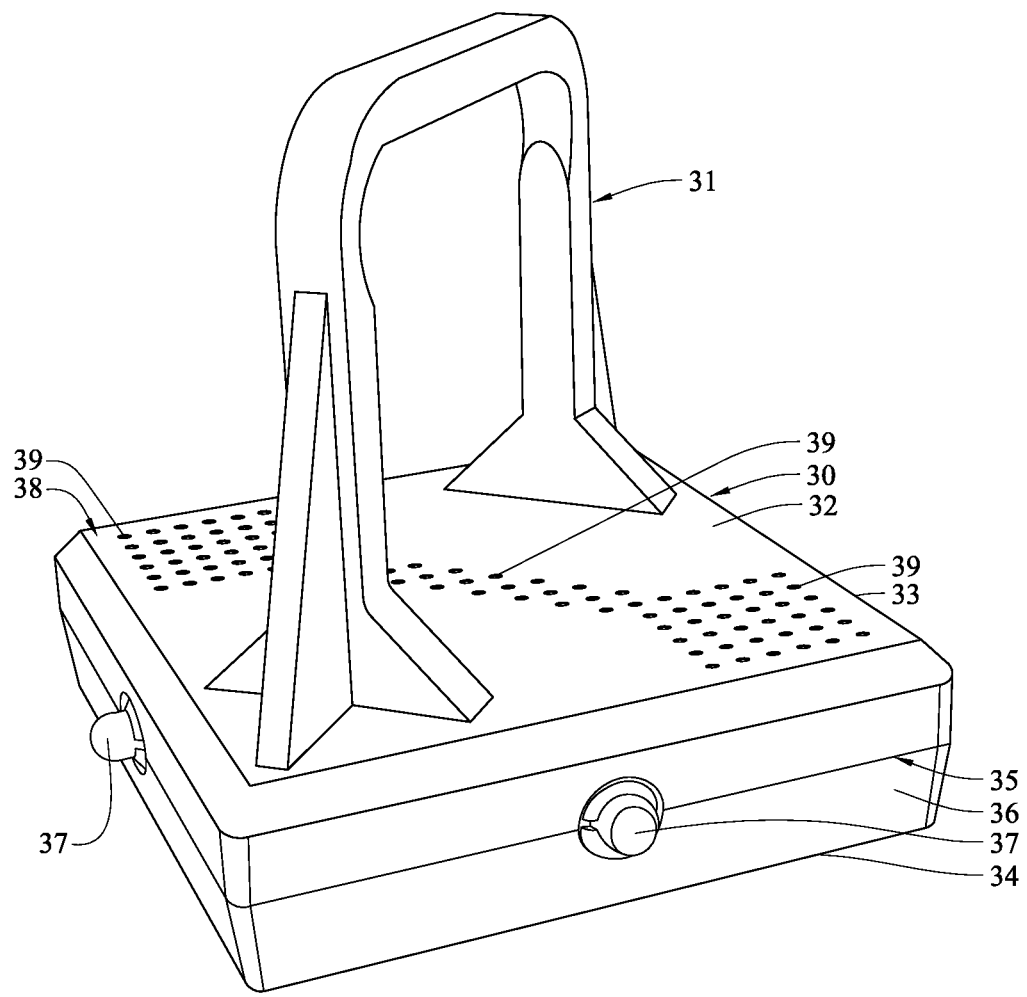
FIG. 6 is an isometric view of the top cap of the damaged fuel container of FIG. 1, wherein the top cap has been removed.

Referring now to FIGS. 3-4 and 6 concurrently, the details of the top cap 30, along with its detachable coupling to the elongated tubular body 10 will be discussed in greater detail. The top cap 30 is shaped to provide a strong attachment location for lifting the loaded DFC 100. A handle 31 is fixedly coupled to the top cap 30 and extends upward from a top surface 32 of the top cap 30 so that the DFC 100 can be easily handled by a crane or other handling equipment. As can be seen, when the top cap 30 is detachably coupled to the elongated tubular wall 10 (shown in FIGS. 3-4), the entirety of the top cap 30 is disposed within the top portion 19 of the elongated tubular wall 10. A portion of the handle 31, however, protrudes axially from the top edge 13 of the elongated tubular wall 13. Nonetheless, the entirety of the handle 31 is located fully within a transverse perimeter defined by the top edge 13 of the elongated tubular wall 10 (viewed from a plane that is substantially perpendicular to the container axis C-C). As a result, the handle 31 can be easily grabbed by lifting mechanisms when the DFC 100 is fully inserted into a fuel cell of a fuel rack, without the grid 401 of the fuel basket 400 interfering with the lifting mechanism (FIGS. 10 and 11).

The top cap 30 comprises a body 33. In one embodiment, the body 33 is formed of any of the materials described above for the elongated tubular wall 10. In another embodiment, the body 33 is formed of any of the materials described above for the bottom cap 20.

The top cap 30 has a bottom surface 34, a top surface 32 and a peripheral sidewall 35. The peripheral sidewall 35 comprises a chamfered portion 36 at a lower edge thereof to facilitate insertion into the top opening 17 of the elongated tubular wall 10. The top cap 30 has a transverse cross-sectional shape that is the same as the transverse cross-sectional shape of the container cavity 101.

A plurality of locking elements 37 protrude from the peripheral sidewall 35 of the top cap 30 and, as discussed in greater below, are alterable between a fully extended state (shown in FIGS. 3-4 and 6) and a fully retracted state (shown in FIG. 9) to facilitate repetitive coupling and uncoupling of the top cap 30 to the elongated tubular wall 10. In the exemplified embodiment, the locking elements 37 are spring-loaded pins. In other embodiments, the locking elements 37 can be tabs, protuberances, clamps, tangs, and other known mechanisms for locking components together The top cap 30 also comprises a second screen 38. The second screen 38 comprises a plurality of openings 39 that define upper vent passageways into a top 103 of the container cavity 101. While in the exemplified embodiment the second screen 38 is incorporated into the top cap 30, the second screen 38 can be incorporated into the elongated tubular wall 10 at a position below where the top cap 30 couples to the elongated tubular wall 10 in other embodiments.

In one embodiment, the openings 39 of the top cap are small enough so that radioactive particulate matter cannot pass therethrough but are provided in sufficient hole density (number of openings/area) to allow sufficient venting of air and gases (or other fluids) through the container cavity 101. In one embodiment, the openings 39 have a diameter in a range of 0.03 mm to 0.1 mm, and more preferably a diameter of about 0.04 mm. The openings 39 may be provided for the second screen 38, in certain embodiments, to have a density of 200 to 300 holes per square inch. The invention, however, is not limited to any specific dimensions or hole density of the openings 39 unless specifically claimed.

In the exemplified embodiment, the second screen 38 is integrally formed into the body 33 of the top cap 30 by creating the openings 39 directly into the body 33 of the bottom cap 20. The openings 39 can be formed into the body 33 of the top cap 30 by punching, drilling or laser cutting techniques. In one embodiment, it is preferred to form the openings 39 using a laser cutting technique. Laser cutting allows very fine openings 39 to be formed with precision and efficiency. In alternate embodiments, the openings 39 of the second screen 38 may not be integrally formed into the top cap 30 (or the elongated tubular wall 10). Rather, larger through holes can be formed in the top cap 30 that are then covered by a separate second screen(s), such as a wire mesh screen(s).

Figure 7:
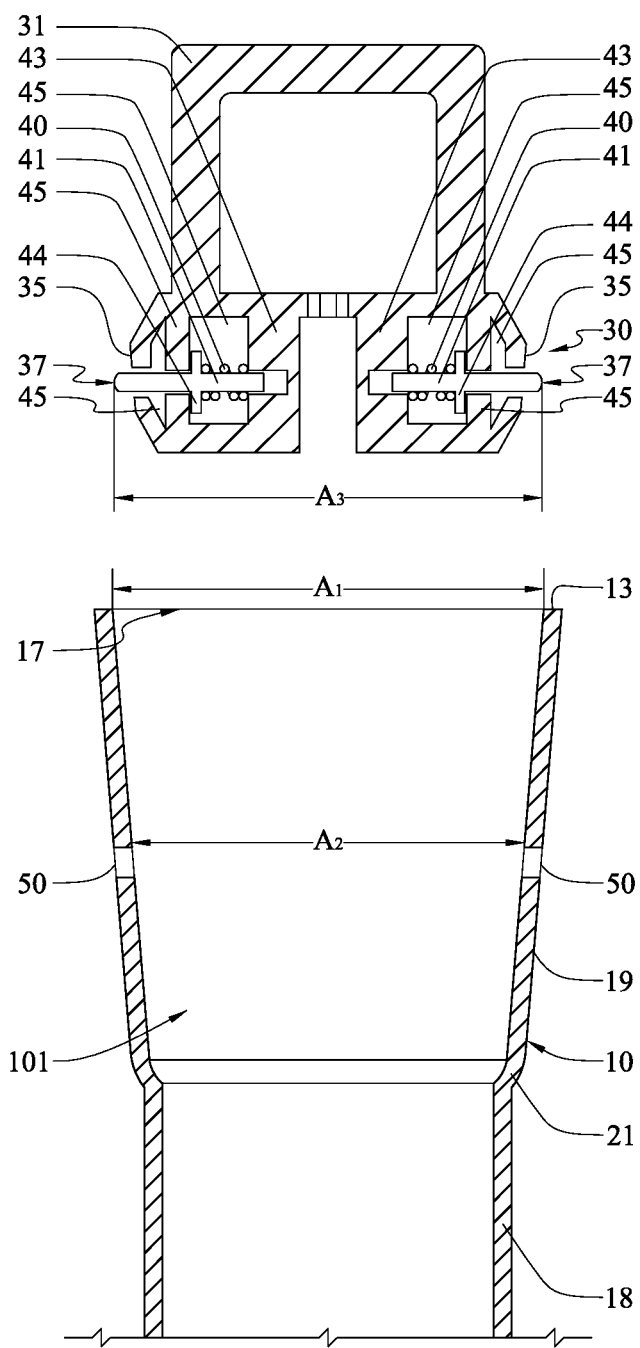
FIG. 7 is a longitudinal cross-sectional schematic of the top cap of FIG. 5 positioned above the elongated tubular wall of the damaged fuel container for detachable coupling thereto.
Figure 8:
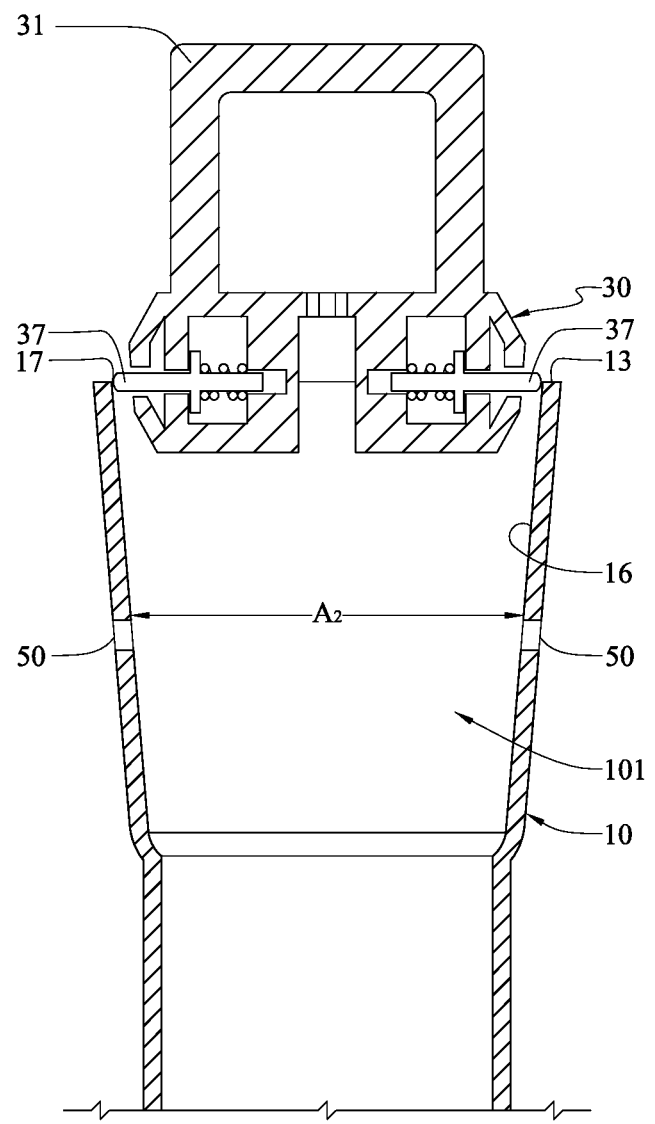
FIG. 8 is a longitudinal cross-sectional schematic wherein the top cap of FIG. 5 has been partially inserted through a top opening of the elongated tubular wall of the damaged fuel container.
Figure 9:
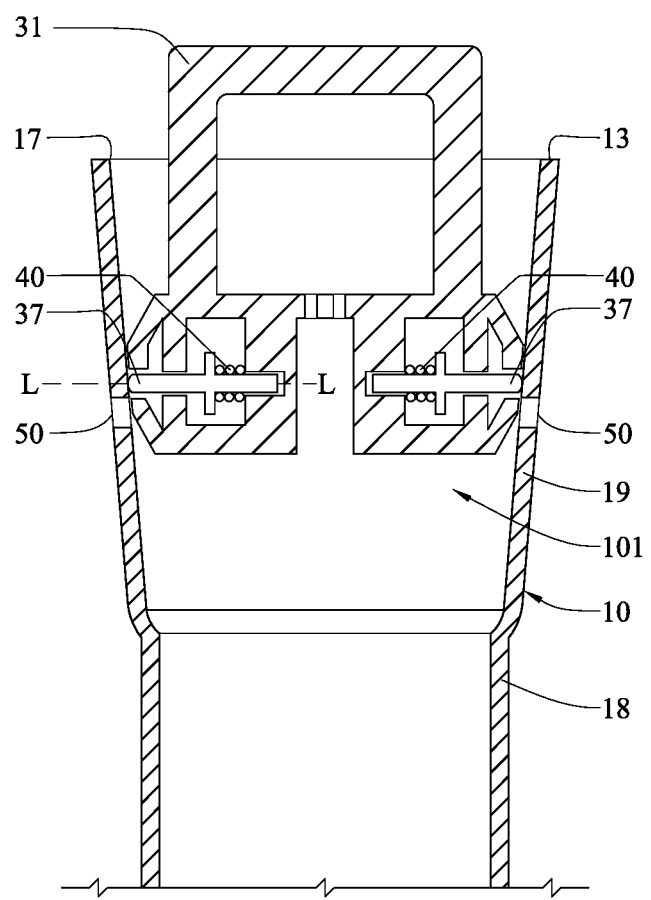
FIG. 9 is a longitudinal cross-sectional schematic wherein the top cap of FIG. 5 has been slidably inserted into the container cavity of the elongated tubular wall, and wherein the locking elements of the top cap have been forced into a fully retracted state due to contact with the elongated tubular wall.

Referring now to FIGS. 7-9, additional details of the locking elements 37 of the top cap 30, and the coupling of the top cap 30 to the elongated tubular wall 10, will be described. As mentioned above, the locking elements 37 are alterable between a fully extended state (FIG. 7) and a fully retracted state (FIG. 9).

Referring solely now to FIG. 7, each of the locking elements 37 is biased into the fully extended state by a resilient element 40, which in the exemplified embodiment is a coil spring that is fitted over a shaft portion 41 of the locking element 37. In the exemplified embodiment, the springs 40 bias the locking elements 37 into the extended state through contact with a first wall 43 of the top cap 30 on one end and a flange 44 of the shaft portion 41 of the locking element 37 on the other end. Overextension of the locking elements 37 out of the peripheral sidewall 35 is prevented by contact interference between the flanges 44 of the shaft portions 41 and second walls 45 of the top cap. Upon the application of adequate force to the locking elements 37, the spring force of the springs 40 is overcome and each of the locking elements 37 will translate along its locking element axis L-L (FIG. 4) to the fully retracted state. In the exemplified embodiment, the locking element axes L-L are substantially perpendicular to the container axis C-C. In certain embodiments, the internal chambers 45 in which the springs 40 and portions of the locking elements 37 nest are hermetically sealed. This can be accomplished by incorporating a suitable gasket about the shaft portion 41 of the locking element at the peripheral sidewall 35. In the exemplified embodiment, a locking element 37 is provided on each one of the four sections of the peripheral sidewall 35 and are centrally located thereon at the cardinal points.

As described in greater detail below, the locking elements 37 are forced from the fully extended state to the fully retracted state due to contact between the extruded tubular wall 10 and the locking elements 37 during insertion of the top cap 30 into the container cavity 101. As can be seen in FIG. 7, the portion of the container cavity 101 defined by the top portion 19 of extruded tubular wall has a transverse cross-section that gradually tapers (i.e. decreases in size) moving away (i.e., downward in the illustration) from a top edge 13 of the elongated tubular wall 10. Thus, the container cavity 101 has a transverse cross-section $A_1$ at the top opening 17 that is greater than the transverse cross-section $A_2$ of the container cavity 101 at an axial position immediately above locking apertures 50 formed into the elongated tubular wall 10.

As mentioned above, the locking elements 37 are biased into a fully extended state and, thus, protrude from all four sections of the peripheral sidewall 35. As a result of the protruding locking elements 37, the top cap 37 has an effective transverse cross-section $A_3$ when the locking elements 37 are in the fully extended state. The DFC 100 is designed, in the exemplified embodiment, so that the effective transverse cross-section $A_3$ of the top cap 30 is the same as or smaller than the transverse cross-section $A_1$ of the top opening 17 of the internal cavity 101. The effective transverse cross-section $A_3$ of the top cap 30, however, is greater than the transverse cross-section $A_2$ of the container cavity 101 at the axial position immediately above locking apertures 50.

Referring now to FIG. 8, as a result of the relative dimensions described immediately above, when the top cap 30 is initially aligned with and lowered into the top opening 17 of the container cavity 101, the top cap 70 (including the locking elements 70) can pass through the top opening 17 while the locking elements 37 remain in the fully extended state. Thought of another way, the top edge 13 defines the top opening 17 so as to have a transverse cross-section through which the top cap 30 can be inserted while the locking elements 37 are in the fully extended state.

As the top cap 30 continues to be inserted (i.e., lowered in the illustration), the locking elements 37 come into contact with the inner surface 16 of the top portion 19 of the elongated tubular wall 10 that defines that portion of the container cavity 101. Due to the fact that the inner surface 16 is sloped such that the transverse cross-section of the container cavity 101 continues to decrease with distance from the top edge 13, the locking elements 37 are further forced into retraction by the inner surface 16 of the elongated tubular wall 10 until a fully retracted state is achieved at the axial position immediately above locking apertures 50 (FIG. 9).

Referring to FIG. 9, the locking elements 37 are at the axial position immediately above locking apertures 50 of the elongated tubular wall 10 and are in the fully retracted state. In the fully retracted state state, the springs 40 are fully compressed and the locking elements 37 have been translated inward along the locking element axis L-L. As lowering of the top cap 30 is continued, the locking elements 37 become aligned with the locking apertures 50 of the elongated tubular wall 10 and are automatically returned back into the fully extended state in which the locking elements 37 protrude into the locking apertures 50 due to the bias of the springs 40 (shown in FIG. 4). As a result of the locking elements 37 protruding into the locking apertures 50, the top cap 30 is coupled to the elongated tubular wall 10 so that the DFC 100 can be lifted by the handle 31. The locking elements 37 cannot be forced back into the retracted state due to contact with the edges that define the locking apertures 50. In other words, once the top cap 30 is coupled to the elongated tubular wall 10 as described above, the locking elements 37 cannot be retracted by applying a lifting or pulling force (i.e. an axial force along the container axis C-C) to the top cap 30. Thus, a secure connection between the top cap 30 and the elongate tubular wall 10 is provided. In order to remove the top cap 30 from the elongated tubular wall 10, a tool is required to unlock the top cap 30 from the elongated tubular wall 10 by pressing the locking elements 37 radially inward along their locking element axes L-L. In the exemplified embodiment, the locking apertures 50 are through-holes and, thus, the locking elements 37 can be pressed inward by the access provided tto the locking elements 37 by the locking apertures 50.

The exemplified embodiment is only one structural implementation in which the top cap 30 and the elongated tubular wall 10 are configured so that upon the top cap 30 being inserted through the top opening 17, contact between the locking elements 37 and the elongated tubular wall 10 forces the locking elements 37 into a retracted state. In other embodiments, the effective transverse cross-section $A_3$ of the top cap 30 may be larger than the transverse cross-section $A_1$ of the top opening 17 of the internal cavity 101. In such an embodiment, the lower edges of the locking elements 37 can be appropriately chamfered and/or rounded so that upon coming into contact with the top edge 13 of the elongated tubular wall 10 during lowering, contact between the lower edges of the locking elements 37 and the top edge 13 of the elongated tubular wall 10 forces the locking elements 37 to translate inward along their locking element axes L-L. In other embodiments, the top edge 13 of the elongated tubular wall 10 may be appropriately chamfered to achieve the desired translation of the locking elements 37.

Referring now to FIGS. 10-12 concurrently, a system 1000 for storing and/or transporting damaged nuclear fuel is illustrated according to an embodiment of the present invention. The system 1000 generally comprises a vessel 500, a fuel basket 400 and at least one of the DFCs 100 described above. The vessel 500, when fully assembled, forms a fluid-tight vessel cavity 501 in which the fuel basket 400, the DFC 100 containing damaged nuclear fuel and intact nuclear fuel 50 are housed (in FIG. 10, the loaded DFC 100 and the intact nuclear fuel 50 are schematically illustrated for simplicity). Thus, the vessel 500 can be considered a pressure vessel that forms a fluidic containment boundary about the vessel cavity 501. In the exemplified embodiment, the vessel 500 is a canister, such as a multi-purpose canister. In embodiments, where the vessel is an MPC, the system 100 may also comprises an overpack cask, such as an above-ground or below-ground ventilated vertical overpack. In other embodiments, the vessel 500 may be a metal cask.

The vessel 500 comprises a cylindrical shell 502, a lid plate 503 and a floor plate 504. The lid plate 503 and the floor plate 504 are seal welded to the cylindrical shell 502 so to form the hermetically sealed vessel cavity 501. A top surface 505 of the floor plate 504 forms a floor of the vessel cavity 501. The vessel 500 extends along a vessel axis V-V, which is arranged substantially vertical during normal operation and handling procedures.

The fuel basket 400 is positioned within the vessel cavity 502 and comprises a gridwork 401 forming a plurality of elongated cells 403A-B. In the exemplified embodiment, the gridwork 401 is formed by a plurality of intersecting plates 402 that form the cells 403A-B. In one embodiment, the plates 402 that form the gridwork 401 are formed of stainless steel. Because the elongated tubular wall 10 of the DFC 100 is made of a boron carbide aluminum matrix composite material, or a boron aluminum matrix composite material, and the gridwork 401 is made of stainless steel, there is no risk of binding from the cohesion effect of materials of identical genre.

Each of the elongated cells 403A-B extend along a cell axis B-B that is substantially parallel to the vessel axis V-V. The plurality of cells 403A-B comprises a first group of cells 403A that are configured to receive intact nuclear fuel 50 and a second group of cells 403B configured to receive DFCs 100 containing damage nuclear fuel. Each of the cells 403A of the first group comprise neutron absorbing liner panels 404 while the each of the cells 403B of the second group are free of the neutron absorbing liner panels 404. In one embodiment, the neutron absorbing liner panels 404 can be constructed of the same material that is described above for the elongated tubular wall 10.

Because the elongated tubular wall 10 of the DFC 100 incorporate neutron absorber as described above, the cells 403B of the fuel basket 400 that are to receive the DFCs 100 do not require such neutron absorber plates 404, leading to an increased cell cavity size which is large enough to enable free insertion or extraction of the DFC 100 from the fuel basket 400. In certain embodiments, the cell opening of the cells 403B is 6.24 inches, which means that there is a ¼ inch lateral gap between the DFC 100 and the grid that forms the storage cell 403B. Moreover, because the DFC 100 is extruded and the cells 403A-B of the fuel basket 400 are of honeycomb construction made of thick plate stock (¼ inch wall), there is a high level of confidence that the DFCs 100 can be inserted into the storage cells 403B without interference. In the exemplified embodiment, all of the cells 403A-B have the same pitch therebetween.

Referring now to FIGS. 11 and 12, each of the DFCs 100 is loaded into one of the cells 403B by aligning the DFC 100 with the cell 403B and lowering the DFC 100 therein until the floor plate 25 of the DFC 100 comes into surface contact with and rests on the top surface 505 of the floor plate 504 of the vessel 500. When positioned within the cell 403B, the container axis C-C of the DFC 100 is substantially parallel to the cell axis B-B and, in certain embodiments, substantially coaxial therewith.

As mentioned above, the cell axis B-B is substantially parallel to the vessel axis V-V. Thus, when the DFC 100 is loaded within the cell 403B, the oblique wall 26 of the bottom cap 20 is oblique to both the cell axis B-B and the vessel axis V-V. As mentioned above, the top surface 505 of the floor plate 504 forms a floor of the vessel cavity 501. Thus, when the DFC 100 is loaded within the cell 403B, the lowermost opening(s) 23A of the first vent(s) 22 is a distance $d_3$ above the floor 505 of the vessel 500 while the uppermost opening(s) 23C of the first vent(s) 22 is a distance $d_4$ above the floor 505 of the vessel 500.

In summary, the DFC 100 of the present invention fits in the storage cell 403B with adequate clearance. The DFC 100 also provides adequate neutron absorption to meet regulatory requirements. The DFC 100 also confines the particulates but allow water and gases to escape freely. The DFC 100 also features a robust means for handling and includes a smooth external surface to mitigate the risk of hang up during insertion in or removal from the storage cell 403 B. The DFC also provides minimal resistance to the transmission of heat from the contained damaged nuclear fuel. The loaded DFC 100 can be handled by a grapple from the Fuel Handling Bridge. All lifting appurtenances are designed to meet ANSI 14.6 requirements with respect to margin of safety in load handling. Specifically, the maximum primary stress in any part of the DFC 100 will be less than its Yield Strength at 6 times the dead weight of the loaded DFC,W. and less than the Ultimate Strength at 10 times W.

The table below provides design data for one embodiment of the DFC 100.

| DFC: Design Data | |
|---|---|
| Outer Dimension | 152 mm (5.99") |
| Corner Radius | 6 mm (0.24" nominal) |
| Wall Thickness | 2.0 mm (0.079") |
| DFC Cell I.D. | 148 mm (5.83") |
| Total Height | 4680 mm (184.25") |
| Boron Carbide Concentration | 32% (nominal) |
| Empty Weight, Kg | 25 (55 lbs) |
| Permissible Planar Average Enrichment | 4.8% |

A method of manufacturing the DFC 100 according to an embodiment of the present invention will now be described. First, the elongated tubular wall 10 is formed via an extrusion process using a metal matrix composite having neutron absorbing particulate reinforcement. A boron carbide aluminum matrix composite material is preferred. At this stage, the extruded elongated tubular wall 10 (and the container cavity 101) has a substantially constant transverse cross-section, with the elongated tubular wall 10 also having a substantially uniform wall thickness. The elongated tubular wall 10 is then taken and a portion thereof is expanded so that the container cavity 101 has an increased transverse cross-section, thereby forming the top portion 19 and the bottom portion 18 elongated tubular wall 10. Expansion of the container cavity 101 (which can also be considered expansion of the elongated tubular wall 10) can be accomplished using a swaging process using an appropriate mandrel, die and/or press. Said swaging process can be a hot work in certain embodiments. In an alternate embodiment, the difference sizes in transverse cross-section of the container cavity 101 can be accomplished by performing a drawing process to reduce the bottom portion 18 of the elongate tubular wall 10.

The locking apertures 50 are then formed into the top portion of the elongated tubular wall 10 via a punching, drilling, or laser cutting technique.

The bottom cap 20 is then formed. Specifically, the bottom cap 20 is formed by casting aluminum to form the cap body 24. The plurality of openings 23 are then integrally formed therein using a laser cutting process to form the first screens 22 on the oblique wall 26.

The bottom cap 20 is then autogenously welded to the bottom end 12 of the elongated tubular wall 10. More specifically, the bottom cap 20 is butt welded to the bottom end 12 of the elongated tubular wall 10 to produce a weld junction that is smooth with the outer surface 15 of the elongated tubular wall 10. A friction stir weld technique may be used.

The top cap 30 is then formed and coupled to the elongated tubular wall 10 as described above.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A method of forming an elongated tubular container for receiving damaged nuclear fuel, the method comprising:
   a) extruding, from a material comprising a metal and a neutron absorber, an elongated tubular wall having a container cavity;
   b) forming, from a material comprising a metal that is metallurgically compatible with the metal of the elongated tubular wall, a bottom cap comprising a first screen having a plurality of openings; and
   c) autogeneously welding the bottom cap to a bottom end of the elongated tubular wall, the plurality of openings of the first screen forming vent passageways to a bottom of the container cavity;
   wherein after the extruding step, a further step of expanding a portion of the transverse cross-section of the container cavity along a top portion of the elongated tubular wall.

2. The method according to claim 1 wherein step b) further comprises:
   b-1) casting a body of the bottom cap; and
   b-2) integrally forming the plurality of openings into the body of the bottom cap to form the first screen.

3. The method according to claim 2 wherein the plurality of openings are integrally formed by laser cutting the plurality of openings into the body of the bottom cap.

4. The method according to claim 1 wherein the elongated tubular wall is formed of a metal matrix composite having neutron absorbing particulate reinforcement.

5. The method according to claim 4 wherein the metal matrix composite having neutron absorbing particulate reinforcement is a boron carbide aluminum matrix composite material.

6. The method according to claim 1 wherein the bottom cap is formed of aluminum.

7. The method according to claim 1 wherein step c) further comprises:
c-1) butt welding the bottom cap to the bottom end of the elongated tubular wall to produce a weld junction that is smooth with an outer surface of the elongated tubular wall.

8. The method according to claim 1 wherein the container cavity of the elongated tubular wall resulting from step a) has a substantially constant transverse cross-section below the expanded top portion of the elongated tubular wall.

9. The method according to claim 1 wherein the expanded portion of the transverse cross-section of the container cavity tapers moving away from a top edge of the elongated tubular wall.

10. The method according to claim 1 further comprising:
d) forming a top cap having a second screen comprising a plurality of openings; and
e) detachably coupling the top cap to the elongated tubular wall, the plurality of openings of the first cap forming vent passageways into a top of the container cavity.

11. The method according to claim 10 wherein step e comprises:
e-1) sliding the top cap into an open top end of the container cavity, wherein locking elements of the top cap that are normally biased into an extended state are forced into a retracted state due to contact with the elongated tubular wall during said sliding; and
e-2) upon the locking elements of the top cap becoming aligned with locking apertures of the elongated tubular container, the locking elements automatically returning to the extended state such that the locking elements protrude into the locking apertures.

12. A method of forming an elongated tubular container for receiving damaged nuclear fuel, the method comprising:
a) extruding, from a material comprising a metal and a neutron absorber, an elongated tubular wall having a container cavity;
b) forming, from a material comprising a metal that is metallurgically compatible with the metal of the elongated tubular wall, a bottom cap comprising a first screen having a plurality of openings;
c) autogeneously welding the bottom cap to a bottom end of the elongated tubular wall, the plurality of openings of the first screen forming vent passageways to a bottom of the container cavity;
d) forming a top cap having a second screen comprising a plurality of openings;
e) detachably coupling the top cap to the elongated tubular wall, the plurality of openings of the first cap forming vent passageways into a top of the container cavity;
e-1) sliding the top cap into an open top end of the container cavity, wherein locking elements of the top cap that are normally biased into an extended state are forced into a retracted state due to contact with the elongated tubular wall during said sliding; and
e-2) upon the locking elements of the top cap becoming aligned with locking apertures of the elongated tubular container, the locking elements automatically returning to the extended state such that the locking elements protrude into the locking apertures.

* * * * *